UNITED STATES PATENT OFFICE.

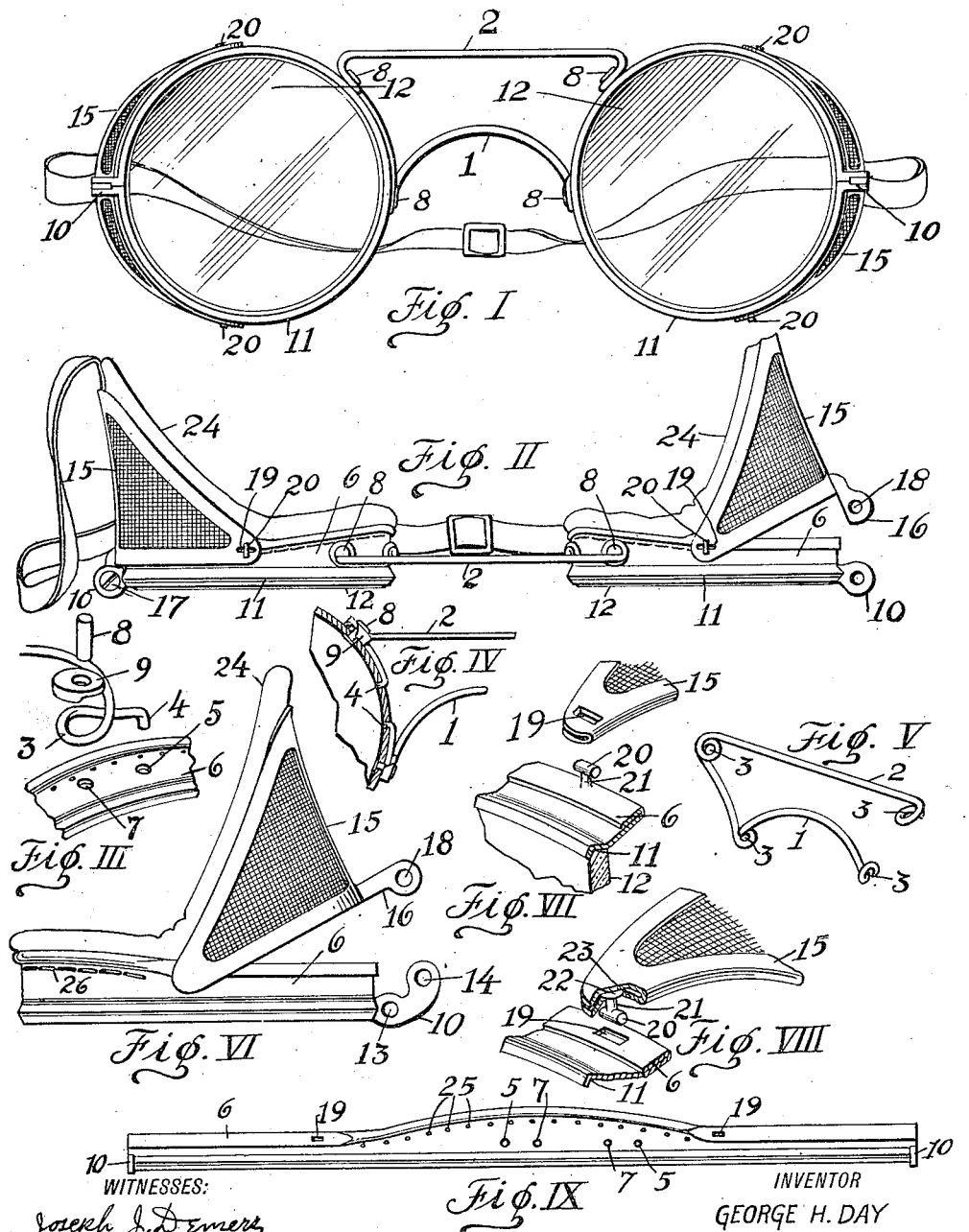

GEORGE H. DAY, OF SOUTHBRIDGE, MASSACHUSETTS, ASSIGNOR TO AMERICAN OPTICAL COMPANY, OF SOUTHBRIDGE, MASSACHUSETTS.

EYE-PROTECTOR.

1,295,128.      Specification of Letters Patent.      Patented Feb. 25, 1919.

Application filed June 8, 1916. Serial No. 102,451.

*To all whom it may concern:*

Be it known that I, GEORGE H. DAY, a citizen of the United States, residing at Southbridge, in the county of Worcester and State of Massachusetts, have invented certain new and useful Improvements in Eye-Protectors, of which the following is a specification.

This invention relates to improvements in eye protectors and has particular reference to an improved simplified frame and parts associated therewith in such manner as to provide a strong durable and readily assembled eye protector.

One of the leading objects of this invention is the provision of a frame shaped and constructed from sheet metal or the like to provide a rigid and substantial lens attaching member and provided with a plurality of apertures of various shapes and sizes to facilitate attachment of the various additional parts of the protector thereto.

A further object of the invention is the provision of an improved structure of bridge for attachment to said frame.

Another object of the invention is the provision of an improved construction of screen member and of means for readily attaching the screen to or permitting of removal of the screen from the frame member.

A further object of the invention is the provision on the screen of improved means adapted to interlock with permanent portions of the regular frame to rigidly connect the screen and frame member in a substantially unitary construction without the use of solder or the like.

Other objects and advantages of my invention should be readily apparent by reference to the following specification taken in connection with the accompanying drawings forming a part thereof, and it will be understood that I may make any modifications in the specific details of construction shown and described within the scope of the appended claims without departing from or exceeding the spirit of my invention.

Figure I represents a front elevation of my improved protector.

Fig. II represents a plan view thereof.

Fig. III represents a fragmentary perspective view illustrating the attachment of the bridge end to the lens frame.

Fig. IV represents a fragmentary sectional view showing the parts secured in position.

Fig. V represents a perspective view of a one-piece bridge member.

Fig. VI represents an enlarged view showing the screen with an attachment adapted to fit into the place ordinarily occupied by a temple.

Fig. VII represents a fragmentary perspective view of one form of lock between the shield and frame.

Fig. VIII represents a similar view of a slightly different construction.

Fig. IX represents a plan view of the frame member before shaping to a lens.

In the drawings, in which similar characters of reference are employed to denote corresponding parts throughout the several views, the numeral 1 designates the arched bridging member adapted to rest on or pass just above the bridge of the nose, while the numeral 2 designates the upper supplemental bridging or bracing member.

In most of the figures of the drawings I have shown these two as separate parts, although in Fig. V they are illustrated as formed from a single piece of material, the structure in the two instances being otherwise substantially the same.

The bridging members 1 and 2, as will perhaps be most clearly understood by reference to Figs. III and IV, have formed at their ends the eyes 3, while the terminal ends are bent inward in the book like or engaging portions 4 adapted to be received in apertures 5 in the frame, while the frame member 6 is provided with the additional apertures 7 adapted to receive the rivets or the like 8 which pass through the eyes 3, shaped washer members 9 preferably engaging the eyes 3 and adjacent portion of the rim to permit of better tightening of the rivets to lock the parts together. The advantage of this construction should be readily apparent in consideration of Fig. IV for example, in which it will be noted that the members 1 and 2 are securely retained at the points of attachment to the frame by the rivets 8, while the extending hook portions 4 locking into the frame brace the members preventing any play of the parts about the rivets 8 as pivot points without actual bending or springing out of position of the lens frames and bridging members, thus insuring the preservation of alinement of the parts and the provision of a most rigid and efficient construction.

It is to be understood that the frame members 6 are preferably provided with suitable end pieces as at 10 to detachably unite their ends and are further provided with the lens receiving grooves 11 into which fit the lenses 12, being locked into position by tightening together of the end pieces. The edges of the frame members opposite the grooves 11 are bent upon themselves to form a reinforcing bead, the central portion of which is rounded and slightly curved while the ends are flattened out and disposed parallel with the grooves 11. These end pieces may be of either the single type illustrated in Fig. II for example or the double construction shown in Fig. VI, as preferred.

In the case of the construction shown in Fig. VI for example, a fastening device is secured in the aperture 13 to lock the pieces together, while the aperture 14 serves to receive a pivot or fastening device for a temple or head engaging member when the mounting is used with simply the bridge and lens frame.

When it is desired to make use of the construction in connection with side shield members I suitably secure to the frame 6 the shield members 15 provided with the projecting attachment lugs 16 adapted, in the case of the form shown in Fig. II to fit either between or on one side of the end pieces 10 and be locked thereto by means of the fastening device 17, or as in the case of the structure shown in Fig. VI, the temple may be removed and the lug 16 fitted into the space previously occupied by the temple, a fastener then passing through the aperture 14 of the end piece 10 and the aperture 18 of the lug 16 to secure the several parts together.

It will be understood that this frame is, therefore, particularly adapted when it is desired to use the construction interchangeably, that is, to at times have a side shield and at other times be without the shield, or in which it is desired to make up the frames in stock and then apply shields when preferred.

To facilitate this matter, in the form shown in Figs. VIII and IX for example, I form in the frame suitable longitudinally extending rectangular apertures 19 adapted to receive the mallet heads 20 of the pins 21, these heads being so disposed relative to the screen 15 that when the screen is swung into position substantially at right angles to its normal place the mallet heads 20 may be placed into the apertures 19, while when swung in open position the heads and apertures will be at right angles one to the other and thus interlock and prevent any accidental disengagement of the ends of the screen from the frame, while at the same time the connection of the lug 16 to the end pieces or other suitable parts of the frame 6 will lock the screen securely in open position so that they will be rigidly held at the center and ends and any accidental folding or disengagement prevented. These pins may be attached to the shields in various manners as desired, in the form illustrated the pin having a second basal flange or head 22 placed between the outer portion of the shield and its inturned edges 23, said edges being clamped down upon the portion 22 and around the neck 21 of the pin to securely retain it in position.

A slight reversal of the parts is indicated in Fig. VII, in which the pins 21 are carried upon the frame while the apertures are formed in the shield adapted to receive the heads on the pins.

If desired in order to insure best fitting of the shields to the face, the shields may have suitably permanently secured thereto the leather or other cushioning facing strips 24 which may be co-extensive with the shields only or may in addition be of sufficient length to fit around the inner portion of the frames 6. In this latter instance suitable means are provided for securing the cushioning member to the frame 6, the frame 6 being formed with a plurality of apertures 25 for this purpose. It will be apparent that these openings 25 can be readily used as ventilating openings when not in use for the attachment of the strips 24. These apertures, it will readily be understood, will receive either a thread, in case it is desired to permanently sew the cushion member to the frame, as indicated in certain figures of the drawings, or may receive the fastening clips 26 on the inner portion of the cushioning member 24, said clips passing through a pair of the apertures and being clenched on the opposite side to lock the parts together.

It will be understood that while I have described two forms of detachable connection between the ends of the shield and the frame member and between the frame member and cushion that various other devices may be employed for accomplishing this result without in anywise departing from the spirit of the invention.

I claim:

1. The combination with a lens receiving frame, of a shield pivoted to the frame, a perforated lug projecting centrally from the shield, a laterally projecting perforated lug formed on the frame and a fastening device arranged in the perforations of the lugs to rigidly connect the frame and shield.

2. The combination with a lens receiving frame, of a shield pivoted to the frame, an attaching device projecting from the shield member intermediate its ends, and means for rigidly securing the attaching device to the frame.

3. The combination with a lens frame and a shield member for application thereto, projecting pins carried by the lens frame and said shield member being provided with apertures to receive the pins, of an attaching device projecting from the lens frame and from the shield, and means for rigidly connecting the attaching devices on the lens frame and shield to secure the shield on the frame.

4. In a protector of the character described, the combination with a frame and a shield pivoted to the frame, of an end piece on the frame having a central recess, an attaching ear on the shield disposed to project within the recess in the end piece, and a fastening device passing transversely through the end piece and attaching device on the shield to securely lock the shield in open position.

5. The combination with a lens frame and a shield member, one of said parts having a pair of mallet-headed pins secured thereto and the other of the parts having a pair of elongated apertures formed therein adapted to receive the heads of the pins when the parts are in semi-folded relation and to lock beneath the heads of the pins when the parts are in open or operative relation, of projections on the frame and shield member intermediate the pins and apertures, and means for locking the projections together to retain the shield in operative relation to the frame.

6. A frame member for an eye protector or the like, comprising a strip of material having a lens engaging groove at one edge thereof and a reinforcing bead along a portion at least of the opposite edge thereof, said strip having a plurality of apertures formed therein intermediate its length for attachment of a bridging member and having additional apertures adjacent the reinforcing bead adapted for ventilation and screen attaching purposes, a supplemental or side screen, an interlocking tenon, and socket connections on the screen member and frame member for connecting said parts.

7. The combination with a lens frame and a shield member for application thereto, means for detachably connecting the ends of the shield with the frame, said means locking the shield against detachment when the shield is in an open position, and means for rigidly connecting the central portion of the shield with the frame.

8. A frame member for an eye protector or the like, comprising a strip of material having a lens engaging groove at one edge thereof, the other edge of said strip being bent upon itself to form a reinforcing bead, the central portion of which is rounded and slightly curved and its ends flattened and disposed substantially parallel with the lens groove.

In testimony whereof I affix my signature in the presence of two witnesses.

GEORGE H. DAY.

Witnesses:
JOSEPH J. DEMERS,
H. K. PARSONS.

Copies of this patent may be obtained for five cents each, by addressing the "Commissioner of Patents, Washington, D. C."